United States Patent [19]

Dorner

[11] Patent Number: 4,759,434
[45] Date of Patent: Jul. 26, 1988

[54] DRIVE MECHANISM FOR A CONVEYOR

[75] Inventor: Wolfgang C. Dorner, Oconomowoc, Wis.

[73] Assignee: Dorner Mfg. Corp., Hartland, Wis.

[21] Appl. No.: 20,396

[22] Filed: Mar. 2, 1987

[51] Int. Cl.⁴ ............................................. B65G 47/52
[52] U.S. Cl. .................................. 198/457; 198/787; 198/629; 198/611
[58] Field of Search ............... 198/457, 576, 611, 629, 198/787, 790

[56] References Cited

U.S. PATENT DOCUMENTS

| | | | |
|---|---|---|---|
| 1,733,409 | 10/1929 | Howe | 198/457 |
| 1,737,829 | 12/1929 | Cosgrove | |
| 1,756,653 | 4/1930 | McArthur | 198/787 |
| 1,909,481 | 5/1933 | Allen | 198/457 X |
| 2,622,720 | 12/1952 | Lorig | 198/127 |
| 3,182,783 | 5/1965 | Smoker | 198/457 X |
| 3,268,059 | 8/1966 | Hill | 198/457 |
| 3,303,918 | 2/1967 | Carson | 198/611 X |
| 3,960,262 | 6/1976 | Henig | 198/790 X |
| 4,256,222 | 3/1981 | Gunti | 198/457 |
| 4,496,110 | 1/1985 | Raasch et al. | 242/35.5 |
| 4,572,447 | 2/1986 | Raasch et al. | 242/35.5 |

FOREIGN PATENT DOCUMENTS 0573420 9/1977 U.S.S.R. .................... 198/457

OTHER PUBLICATIONS

IBM Technical Disclosure Bulletin, 10/1978.

*Primary Examiner*—Robert J. Spar
*Assistant Examiner*—D. Glenn Dayoan
*Attorney, Agent, or Firm*—Andrus, Sceales, Starke & Sawall

[57] ABSTRACT

A drive mechanism for a conveyor system. A pair of conveyors are located in parallel spaced relation and each conveyor includes a drive pulley with the drive pulleys being axially aligned. A transfer conveyor consisting of a plurality of parallel drive rollers is located between adjacent ends of the main conveyors. A rotatable input shaft driven by a motor is connected to a bevel gear unit which includes a pair of output shafts disposed normal to the input shaft and the output shafts are operably connected to the respective drive pulleys to drive the main conveyors. In addition, the bevel gear unit includes a second output shaft which is operably connected to one of the rollers of the transfer conveyor to drive that roller. Rotation of the driven roller is transmitted to the other rollers in the transfer conveyor by endless bands that are connected between adjacent rollers.

11 Claims, 1 Drawing Sheet

DRIVE MECHANISM FOR A CONVEYOR

BACKGROUND OF THE INVENTION

Conveyor systems can be employed to route small articles through a series of work stations and such systems frequently include a pair of parallel conveyors that operate in opposite directions along with a connecting or transfer mechanism which transfers articles from one conveyor to the other.

In many conveyor systems it is important that the orientation of the articles on the conveyor system be maintained as each article is transferred from one conveyor to another, meaning that the same end of the article should be leading in the direction of travel on all conveyors.

In the past, various types of transfer mechanisms have been employed to transfer articles from one conveyor to the other. In one type of transfer mechanism, as used in the past, a series of tapered rollers are arranged in a semi-circular or curved path and driven either by a gear or chain drive, while in other types of transfer mechanisms, articles are transferred from one conveyor to the other through use of a rotating platform. However, most transfer mechanisms, as used in the past, have incorporated a separate drive, which has been separate from the drive mechanism for the conveyors.

SUMMARY OF THE INVENTION

The invention is directed to an improved drive mechanism for a conveyor system which operates to drive a pair of parallel main conveyors, as well as a connecting or transfer conveyor. In accordance with the invention, the main conveyors are disposed in parallel spaced relation and each main conveyor includes an endless belt which is driven by a drive pulley or spindle. The drive pulleys are disposed in axial alignment.

The transfer conveyor consists of a series of parallel drive rollers which are located parallel to the main conveyors.

Located between adjacent ends of the main conveyors is a drive unit having a rotatable input shaft driven by a motor and operating a bevel gear unit. The bevel gear unit includes a pair of output shafts which are disposed normal to the input shaft and each output shaft is connected to the drive pulley of one of the main conveyors to thereby drive the main conveyors in opposite directions. The bevel gear unit also includes a third output shaft which is disposed in axial alignment with the input shaft and is connected to one of the rollers in the transfer conveyor to drive the same. Rotation of the driven roller is transmitted to adjacent rollers by resilient endless bands that connect adjacent rollers in the transfer conveyor.

With the drive system of the invention utilizing the bevel gear unit, both the main conveyors as well as the transfer conveyor, are driven from a single power source, thereby substantially simplifying the drive arrangement and reducing the overall cost of the system.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
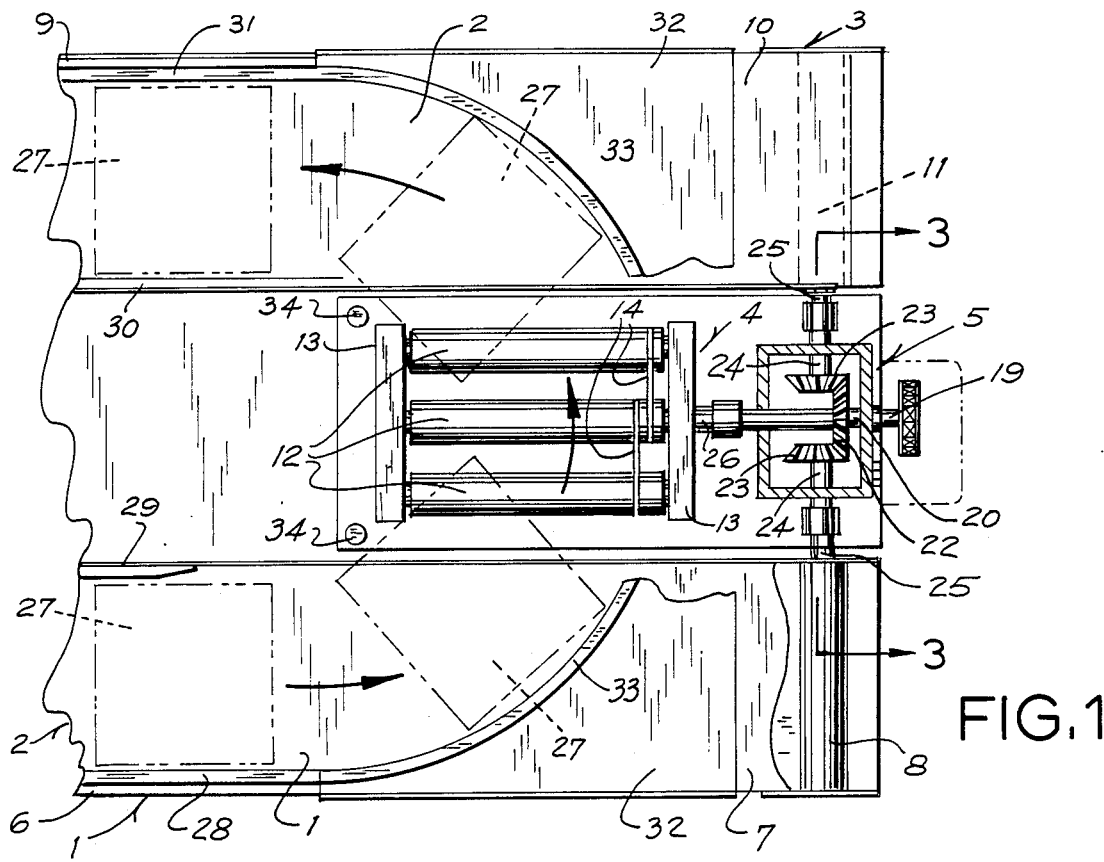
FIG. 1 is a plan view of the drive system of the invention.
Figure 2:
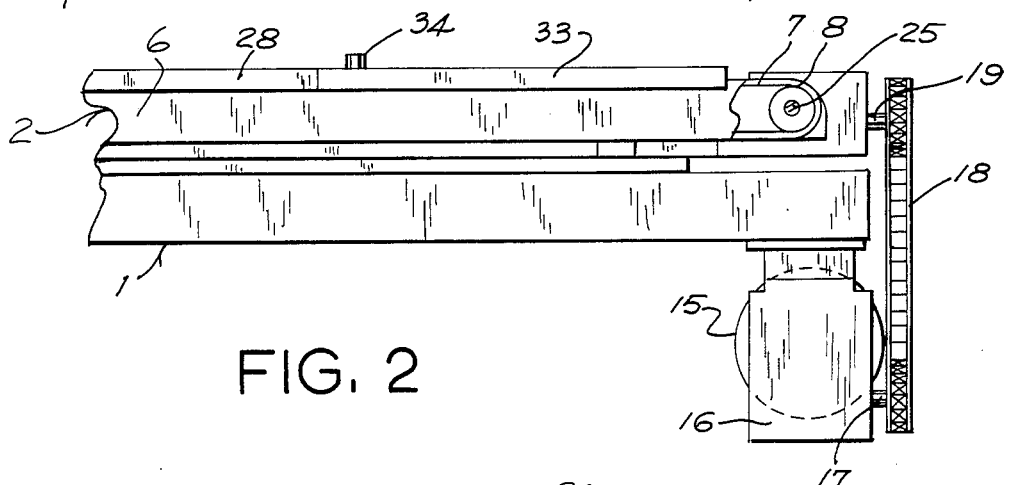
FIG. 2 is a side elevation of the structure of FIG. 1.

FIG. 1 illustrates a drive for a conveyor system. The conveyor system includes a frame or supporting structure 1 that supports a pair of spaced endless belt conveyors 2 and 3, which are adapted to convey a plurality of relatively small articles in the direction shown by the arrows in FIG. 1. Located between adjacent ends of conveyors 2 and 3, is a connecting or transfer conveyor 4. Both of the main conveyors 2 and 3, as well as the transfer conveyor 4, are driven by a drive unit indicated generally by 5.

Conveyor 2 is of a conventional construction and includes a supporting frame 6 and an endless belt 7 is driven by a drive spindle or pulley 8 which is journalled in frame 6.

Conveyor 3 is of similar construction and includes a frame 9 and an endless belt 10 is driven by a drive pulley 11 that is axially aliged with drive pulley 8 of conveyor 2.

Transfer conveyor 4 includes a plurality of parallel rollers 12, the ends of which are journalled within bearing blocks 13 supported on frame 1. Adjacent rollers 12 are connected by resilient or elastomeric bands 14, which are mounted within grooves in the outer periphery of the rollers 12.

Figure 3:
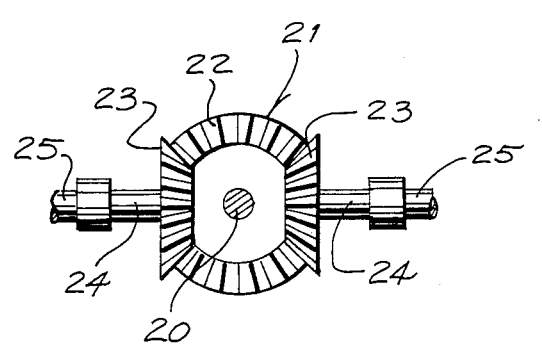
FIG. 3 is a section taken along line 3—3 of FIG. 1.

Drive unit 5 includes a motor 15 which operates through a gear box 16 and the output shaft 17 of gear box 16 is connected by a chain drive 18 to shaft 19, which in turn is coupled to the input shaft 20 of a bevel gear unit 21 mounted on frame 1. As best shown in FIG. 3, shaft 20 carries a bevel gear 22, which is engaged with a pair of bevel gears 23 secured to the ends of shafts 24. Each shaft 24 is coupled to the shaft 25 of the respective drive pulley 8 and 11. With this construction, rotation of shaft 20 operates through the bevel gears 22 and 23 to drive the drive pulleys 8 and 11 in opposite directions.

In addition, input shaft 20 is coupled to shaft 26 of one of the rollers 12 to directly drive the roller. As previously described, the endless bands 14 transmit the rotation of the driven roller 12 to the other rollers in the series. Thus, the drive mechanism operating through the bevel gear unit 21, not only drives the conveyors 2 and 3, but also acts to drive the transfer conveyor 4.

The articles 27 are guided in travel on conveyor 2 by parallel guide rails 28 and 29 and similarly, the articles are guided on conveyor 3 by rails 30 and 31. To guide the articles across the transfer conveyor 4, a plate 32 having a curved guide rail 33 is mounted above the conveyors 2 and 3 and connects rails 28 and 31. In addition, a pair of vertical posts 34 extend upwardly from frame 1 and also serve to aid in turning on pivoting the articles as they are transferred between conveyors.

The upper surface of rollers 12 is slightly above the level of conveyor belts 7 and 10 of conveyors 2 and 3. As the article 27 moving on belt 7 approaches the end of the conveyor 2, it engages and is guided toward the transfer rollers 12 by the curved guide rail 33. The leading corner of the article will rise onto the upstream roller 12, due to the roller being at a slightly higher elevation than belt 7, so that the article will be supported on belt 7 primarily by the rear or trailing corner and this facilitates turning of the article. As belt 10 of conveyor 3 is also at a slightly lower elevation than rollers 12, the article 27, when being discharged from the downstream roller 12 to the conveyor 3, will not hang up on the edge of belt 10.

While the drawings have shown three transfer rollers 12, it is contemplated that one or more rollers can be employed, depending on the spacing between the conveyors 2 and 3 and the size and nature of the articles being conveyed.

The invention provides a simple and effective drive mechanism that acts to not only drive the main conveyors 2 and 3, but also the transfer conveyor 4. The drive mechanism enables the articles to be transferred from one main conveyor to the other while maintaining the orientation of the articles on the conveyor system.

Various modes of carrying out the invention are contemplated as being within the scope of the following claims particularly pointing out and distinctly claiming the subject matter which is regarded as the invention.

I claim:

1. In a conveyor system, a first conveyor having a first drive member, a second conveyor disposed parallel to said first conveyor and having a second drive member axially aligned with said first drive member, a transfer conveyor disposed between adjacent ends of said first and second conveyors, a drive unit including a rotatable input member and a pair of axially aligned first output members disposed normal to said input member, said first output members being operably connected to the respective drive members to drive said first and second conveyors, said drive unit also including a second output member axially aligned with said input member and operably connected to said transfer conveyor to drive said transfer conveyor, said transfer conveyor comprising a series of parallel rollers, said second output member being operably connected to one of said rollers, and connecting means connecting said one roller to the other rollers of said series.

2. The conveyor system of claim 1, wherein said conencting means comprises an endless drive member connecting adjacent rollers of said series.

3. The conveyor system of claim 2, wherein each roller is provided with a circumferential groove to receive said endless drive member.

4. The conveyor system of claim 1, and including bevel gear means interconnecting said input member with said pair of first output members.

5. The conveyor system of claim 1, and including a curved guide rail extending from said first conveyor across said transfer conveyor to said second conveyor.

6. The conveyor system of claim 5, and including a pair of vertical posts disposed at the junction of said transfer conveyor with the respective first and second conveyors.

7. In a conveyor system, a first conveyor including a first endless belt and a first drive member to drive said first endless belt, a second conveyor disposed parallel to said first conveyor and including a second endless belt and a second drive member to drive said second endless belt, said first and second drive members being disposed in axial alignment, a drive unit including a rotatable input shaft, and a pair of axially aligned first output shafts disposed normal to said input shaft, bevel gear means interconnecting said input shaft with said first output shafts to drive said first output shafts in opposite directions, first connecting means for connecting each output shaft to the respective drive member, said drive unit also including a second output shaft operably connected to said input shaft, a transfer conveyor disposed between adjacent ends of said first and second conveyors and including a group of parallel rollers, said second output shaft being operably connected to one of said rollers of said group to drive said roller, connecting means connecting said one roller to other rollers of said group to drive said rollers, and guide means for guiding articles being conveyed on said first conveyor across said transfer conveyor to said second conveyor.

8. The conveying system of claim 7, wherein said connecting means comprises a resilient endless drive member connecting each pair of adjacent rollers of said group.

9. The conveying system of claim 7, wherein said bevel gear means comprises a first bevel gear secured to said input shaft and a pair of second bevel gears engaged with said first bevel gear and secured to the respective first output shafts.

10. The conveying system of claim 9, wherein said input shaft is axially aligned with said one roller.

11. The conveying system of claim 10, wherein said first bevel gear is disposed generally centrally of the length of said input shaft.

* * * * *